United States Patent
Bashyam et al.

(10) Patent No.: US 11,431,014 B2
(45) Date of Patent: Aug. 30, 2022

(54) MEMBRANE ELECTRODE ASSEMBLY WITH FLUORO ALKYL COMPOUND ADDITIVE

(71) Applicant: Ballard Power Systems Inc., Burnaby (CA)

(72) Inventors: Rajesh Bashyam, Delta (CA); Ping He, Surrey (CA); Siyu Ye, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 243 days.

(21) Appl. No.: 16/633,526

(22) PCT Filed: Jul. 17, 2018

(86) PCT No.: PCT/US2018/042498
§ 371 (c)(1),
(2) Date: Jan. 23, 2020

(87) PCT Pub. No.: WO2019/023003
PCT Pub. Date: Jan. 31, 2019

(65) Prior Publication Data
US 2020/0235415 A1    Jul. 23, 2020

Related U.S. Application Data

(60) Provisional application No. 62/537,365, filed on Jul. 26, 2017.

(51) Int. Cl.
*H01M 8/1004* (2016.01)
*H01M 4/86* (2006.01)
(Continued)

(52) U.S. Cl.
CPC ....... *H01M 8/1004* (2013.01); *H01M 4/8652* (2013.01); *H01M 4/8657* (2013.01);
(Continued)

(58) Field of Classification Search
CPC ....... H01M 2008/1095; H01M 4/8652; H01M 4/8657; H01M 4/881; H01M 8/1004; H01M 8/102; Y02E 60/50
See application file for complete search history.

(56) References Cited

U.S. PATENT DOCUMENTS

| | | | |
|---|---|---|---|
| 4,610,938 A * | 9/1986 | Appleby | H01M 4/86 429/498 |
| 6,517,692 B1 | 2/2003 | Zeberinsh | |

(Continued)

FOREIGN PATENT DOCUMENTS

| | | |
|---|---|---|
| JP | 2004-22503 A | 1/2004 |
| JP | 2004-327141 A | 11/2004 |
| JP | 2007-504333 A | 3/2007 |

OTHER PUBLICATIONS

Niedrach, L. et al., "Electrocatalysts for Hydrogen/Carbon Monoxide Fuel Cell Anodes" Electrochemical Technology vol. 5; pp. 318-323; 1967.

*Primary Examiner* — Victoria H Lynch
(74) *Attorney, Agent, or Firm* — Seed IP Law Group LLP

(57) ABSTRACT

A membrane electrode assembly comprises an anode electrode comprising an anode catalyst layer and an anode gas diffusion layer, a cathode electrode comprising a cathode catalyst layer and a cathode gas diffusion layer, a polymer electrolyte membrane interposed between the anode catalyst layer and the cathode catalyst layer, and a layer comprising a fluoroalkyl-phosphonic acid compound between at least one of the anode gas diffusion layer and the anode catalyst layer, the anode catalyst layer and the polymer electrolyte membrane, the polymer electrolyte membrane and the cathode catalyst layer, and the cathode catalyst layer and the cathode gas diffusion layer.

14 Claims, 2 Drawing Sheets

(51) Int. Cl.
    *H01M 4/88*     (2006.01)
    *H01M 8/102*     (2016.01)
    *H01M 8/10*     (2016.01)

(52) U.S. Cl.
    CPC ........... *H01M 4/881* (2013.01); *H01M 8/102* (2013.01); *H01M 2008/1095* (2013.01)

(56) References Cited

U.S. PATENT DOCUMENTS

| | | |
|---|---|---|
| 6,936,370 B1 | 8/2005 | Knights et al. |
| 2004/0013935 A1 | 1/2004 | Ye et al. |
| 2008/0038624 A1 | 2/2008 | Belack et al. |
| 2015/0111126 A1 | 4/2015 | Bashyam et al. |

\* cited by examiner

MEMBRANE ELECTRODE ASSEMBLY WITH FLUORO ALKYL COMPOUND ADDITIVE

BACKGROUND

Technical Field

The present disclosure relates to a membrane electrode assembly with a hydrophobic additive for use in PEM fuel cells, and to catalyst-coated membranes and fuel cells comprising the hydrophobic additive.

Description of the Related Art

Fuel cell systems are currently being developed for use as power supplies in numerous applications, such as automobiles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Polymer electrolyte membrane fuel cells ("PEM fuel cell") employ a membrane electrode assembly ("MEA"), which comprises a polymer electrolyte or ion-exchange membrane disposed between the two electrodes, namely a cathode and an anode. A catalyst typically induces the desired electrochemical reactions at the electrodes. Separator plates, or flow field plates for directing the reactants across one surface of each electrode substrate, are disposed on each side of the MEA to form a fuel cell.

In operation, the output voltage of an individual fuel cell under load is generally below one volt. Therefore, in order to provide greater output voltage, multiple cells are usually stacked together and are connected in series to create a higher voltage fuel cell stack. (End plate assemblies are placed at each end of the stack to hold the stack together and to compress the stack components together. Compressive force provides sealing and adequate electrical contact between various stack components.) Fuel cell stacks can then be further connected in series and/or parallel combinations to form larger arrays for delivering higher voltages and/or currents.

In practice, fuel cells need to be robust to varying operating conditions, especially in applications that impose numerous on-off cycles and/or require dynamic, load-following power output, such as automotive applications. For example, fuel cell anode catalysts are also preferably tolerant to cell voltage reversals and carbon monoxide poisoning; carbon-supported catalysts are also preferably resistant to corrosion during start up and shutdown procedures.

PEM fuel cells typically employ noble metal catalysts, and it is well known that such catalysts, particularly platinum, are very sensitive to carbon monoxide poisoning. This is a particular concern for the anode catalyst of fuel cells operating on reformate, but it also a concern for fuel cells operating on hydrogen, as carbon monoxide (CO) is sometimes present in the hydrogen supply as a fuel contaminant. As described by, e.g., Niedrach et al. in *Electrochemical Technology*, Vol. 5, 1967, p.318, the use of a bimetallic anode catalyst comprising platinum/ruthenium, rather than monometallic platinum, shows a reduction in the poisoning effect of the CO at typical PEM fuel cell operating temperatures. Hence, Pt—Ru catalysts are typically employed as PEM fuel cell anode catalysts.

Ruthenium-based fuel cell catalysts are also useful for mitigating voltage reversals. Voltage reversals occur when a fuel cell in a series stack cannot generate sufficient current to keep up with the rest of the cells in the series stack. Several conditions can lead to voltage reversal in a PEM fuel cell, for example, including insufficient oxidant, insufficient fuel, and certain problems with cell components or construction. Reversal generally occurs when one or more cells experience a more extreme level of one of these conditions compared to other cells in the stack. While each of these conditions can result in negative fuel cell voltages, the mechanisms and consequences of such a reversal may differ depending on which condition caused the reversal. Groups of cells within a stack can also undergo voltage reversal and even entire stacks can be driven into voltage reversal by other stacks in an array. Aside from the loss of power associated with one or more cells going into voltage reversal, this situation poses reliability concerns. Undesirable electrochemical reactions may occur, which may detrimentally affect fuel cell components. Component degradation reduces the reliability and performance of the affected fuel cell, and in turn, its associated stack and array.

As described in U.S. Pat. No. 6,936,370, fuel cells can also be made more tolerant to cell reversal by promoting water electrolysis over anode component oxidation at the anode. This can be accomplished by incorporating an additional catalyst composition at the anode to promote the water electrolysis reaction. As a result, more of the current forced through the fuel cell during voltage reversal can be consumed in the electrolysis of water rather than the oxidation of anode components. Among the catalyst compositions disclosed were Pt—Ru alloys, $RuO_2$ and other metal oxide mixtures and/or solid solutions including Ru.

U.S. Patent Application No. 2004/0013935 also describes an approach to improving cell voltage reversal tolerance by using anodes employing both a higher catalyst loading (at least 60 wt % catalyst) on an optional corrosion-resistant support, and incorporating certain unsupported catalyst compositions to promote the water electrolysis reaction. Disclosed preferred compositions include oxides characterized by the chemical formulae $RuO_x$ and $IrO_x$, where x is greater than 1 and particularly about 2, and wherein the atomic ratio of Ru to Ir is greater than about 70:30, and particularly about 90:10.

To promote water electrolysis in the anode, U.S. Pat. No. 6,517,692 discloses the use of a hydrophobic material such as PTFE and/or FEP to the anode catalyst layer to make them more hydrophobic, thereby hindering the flow of water through the anode. However, such polymers need to be sintered at temperatures higher than the ionomer and membrane decomposition temperatures, which make such polymers difficult to incorporate in the catalyst layer.

As a result, there exists a need for membrane electrode assemblies and fuel cells that are tolerant to cell voltage reversals. Embodiments of the present disclosure address this need and provide associated benefits.

BRIEF SUMMARY

In brief, one embodiment provides a membrane electrode assembly comprising an anode electrode comprising an anode catalyst layer and an anode gas diffusion layer; a cathode electrode comprising a cathode catalyst layer and a cathode gas diffusion layer; a polymer electrolyte membrane interposed between the anode catalyst layer and the cathode catalyst layer; and a layer comprising a fluoro-phosphonic acid between at least one of the anode gas diffusion layer and the anode catalyst layer, the anode catalyst layer and the polymer electrolyte membrane, the polymer electrolyte membrane and the cathode catalyst layer, and the cathode catalyst layer and the cathode gas diffusion layer.

In specific embodiments, the fluoro-phosphonic acid compound is a fluoroalkyl-phosphonic acid compound, such as a perfluoroalkyl-phosphonic acid compound. In further embodiments, the fluoro-phosphonic acid compound is 2-perfluorohexyl ethyl phosphonic acid, that is, a compound with the following structure:

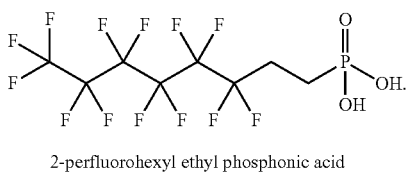 [SMILES: O=P(O)(O)CCC(F)(F)C(F)(F)C(F)(F)C(F)(F)C(F)(F)C(F)(F)F]

2-perfluorohexyl ethyl phosphonic acid

In other embodiments, the fluoro-phosphonic acid compound is (1H,1H,2H,2H-heptadecafluorodec-1-yl) phosphonic acid, that is, a compound with the following structure:

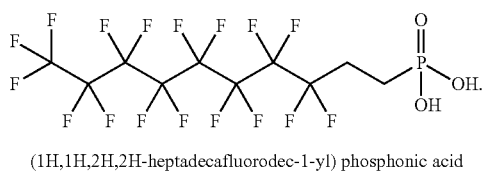 [SMILES: O=P(O)(O)CCC(F)(F)C(F)(F)C(F)(F)C(F)(F)C(F)(F)C(F)(F)C(F)(F)C(F)(F)F]

(1H,1H,2H,2H-heptadecafluorodec-1-yl) phosphonic acid

Another embodiment provides a method of making a membrane electrode assembly comprising mixing a fluoro-phosphonic acid compound with a solvent, an ionomer, or conductive particles to create a mixture, and applying the mixture to one or more of the following, an anode catalyst layer, an anode gas diffusion layer, a polymer electrolyte membrane, a cathode catalyst layer, or a cathode gas diffusion layer.

These and other aspects of the disclosure are evident upon reference in the attached drawings and following detailed description.

DETAILED DESCRIPTION

Figure 1:
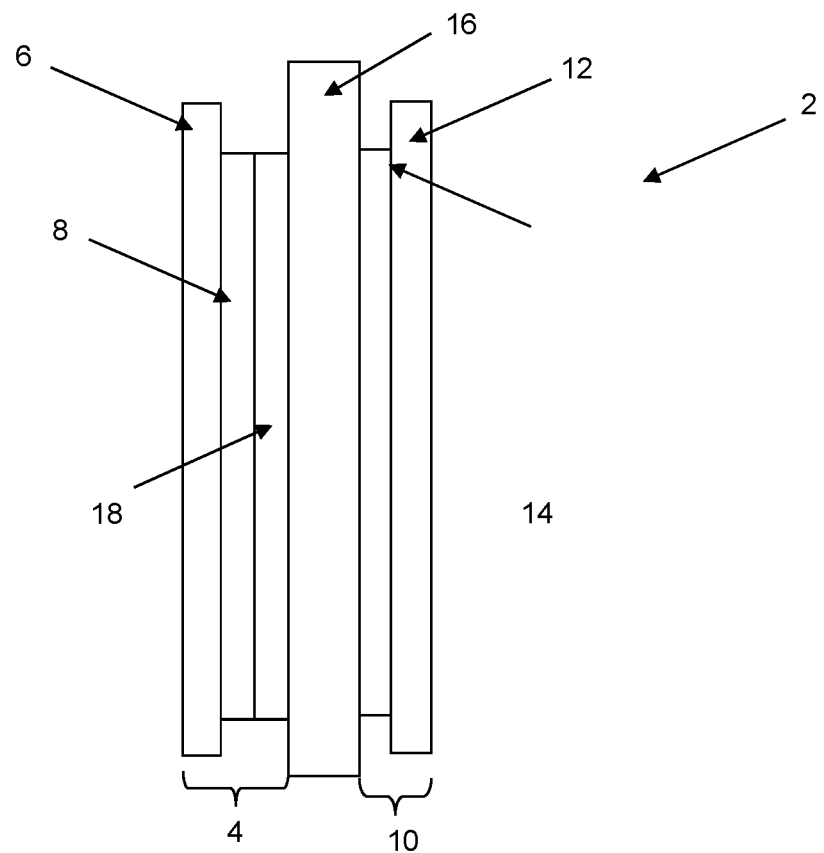
FIG. 1 shows a membrane electrode assembly according to one embodiment.

In the following description, certain specific details are set forth in order to provide a thorough understanding of the various embodiments of the disclosure. However, one skilled in the art will understand that embodiments of the disclosure may be practiced without these details. In other instances, well-known structures associated with fuel cells, fuel cell stacks, batteries and fuel cell systems have not been shown or described in detail to avoid unnecessarily obscuring descriptions of the embodiments of the disclosure.

Unless the context requires otherwise, throughout the specification and claims which follow, the word "comprise" and variations thereof, such as, "comprises" and "comprising" are to be construed in an open, inclusive sense, that is as "including, but not limited to."

"Alkyl" refers to a straight or branched hydrocarbon chain group consisting solely of carbon and hydrogen atoms, which is saturated or unsaturated (i.e., contains one or more double and/or triple bonds), having from one to twelve carbon atoms ($C_1$-$C_{12}$ alkyl), one to eight carbon atoms ($C_1$-$C_8$ alkyl) or one to six carbon atoms ($C_1$-$C_6$ alkyl), and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl, ethenyl, prop-1-enyl, but-1-enyl, pent-1-enyl, penta-1,4-dienyl, ethynyl, propynyl, butynyl, pentynyl, hexynyl, and the like. Unless stated otherwise specifically in the specification, an alkyl group may be optionally substituted.

"Fluoroalkyl" refers to a straight or branched fluorocarbon chain group consisting solely of carbon and fluorine atoms, which is saturated or unsaturated (i.e., contains one or more double and/or triple bonds), having from one to twelve carbon atoms ($C_1$-$C_{12}$ fluoroalkyl), one to eight carbon atoms ($C_1$-$C_8$ fluoroalkyl) or one to six carbon atoms ($C_1$-$C_6$ fluoroalkyl), and which is attached to the rest of the molecule by a single bond. Unless stated otherwise specifically in the specification, a fluoroalkyl group may be optionally substituted.

"Alkylene" or "alkylene chain" refers to a straight or branched divalent hydrocarbon chain linking the rest of the molecule to a substituent group, consisting solely of carbon and hydrogen, which is saturated or unsaturated (i.e., contains one or more double and/or triple bonds), and having from one to twelve carbon atoms, e.g., methylene, ethylene, propylene, n-butylene, ethenylene, propenylene, n-butenylene, propynylene, n-butynylene, and the like. The alkylene chain is attached to the rest of the molecule through a single or double bond and to the substituent group through a single or double bond. The points of attachment of the alkylene chain to the rest of the molecule and to the substituent group can be through one carbon or any two carbons within the chain. Unless stated otherwise specifically in the specification, an alkylene chain may be optionally substituted.

A "corrosion resistant support material" is at least as resistant to oxidative corrosion as Shawinigan acetylene black (Chevron Chemical Company, TX, USA; e.g., as shown in Modern Aspects of Electrochemistry, Number 38, edited by B. E. Conway (2006)).

"Fluoro-phosphonic acid compound" refers to a compound comprising a phosphonic acid moiety (i.e., —P(=O)(OH)$_2$) and at least one fluoro substituent (i.e., —F). A fluoro-phosphonic acid compound may further comprise additional components, for example, aryl (e.g., phenyl), alkyl (or alkylene) and the like. Generally, the fluoro substituent may be attached to an additional component, for example as a substituent on a phenyl or alkyl.

"Fluoroalkyl-phosphonic acid compound" refers to a compound comprising a phosphonic acid moiety (i.e., —P(=O)(OH)$_2$), and a fluoroalkyl moiety (i.e., a branched or straight fluorocarbon chain), for example, —(CF$_2$)$_n$CF$_3$ wherein n ranges from 0 to about 12. The fluoroalkyl moiety may be branched and a fluoroalkyl-phosphonic acid compound may further comprise additional components, for example, aryl (e.g., phenyl), alkyl (or alkylene) and the like.

Figure 2:
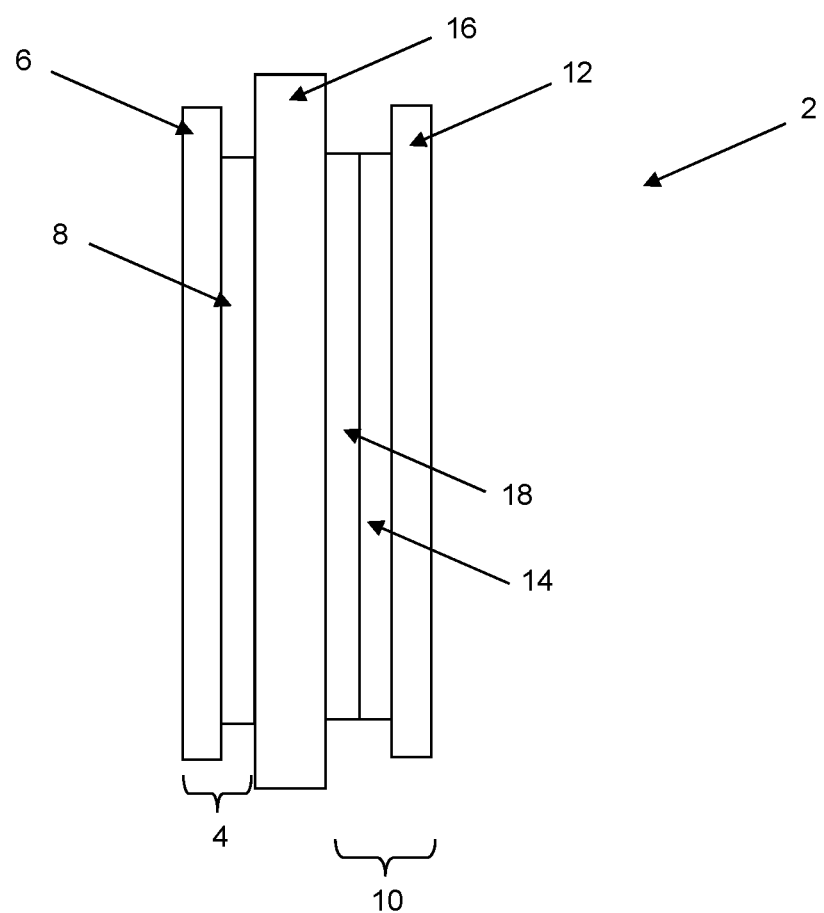
FIG. 2 shows a membrane electrode assembly according to another embodiment.

As shown in FIG. 1, a membrane electrode assembly 2 including an anode electrode 4 having an anode gas diffusion layer 6 and an anode catalyst layer 8; a cathode electrode 10 having a cathode gas diffusion layer 12 and a cathode catalyst layer 14; and a polymer electrolyte membrane 16 interposed between anode catalyst layer 8 and cathode catalyst layer 14. A layer 18 comprising a fluoro-phosphonic acid compound is situated between at least one of anode gas diffusion layer 6 and anode catalyst layer 8, anode catalyst layer 8 and polymer electrolyte membrane 16, polymer electrolyte membrane 16 and cathode catalyst layer 14, and cathode catalyst layer 14 and cathode gas diffusion layer 12. In one specific embodiment as shown in FIG. 1, layer 18 comprising the fluoro-phosphonic acid compound is between anode catalyst layer 12 and polymer electrolyte membrane 16. In another embodiment as shown in FIG. 2, layer 18 comprising the fluoro-phosphonic acid compound is between polymer electrolyte membrane 16 and cathode catalyst layer 14.

As discussed in the foregoing, hydrophobic materials are desirable for water management, particularly for promoting water electrolysis in the anode for voltage reversal mitigation reasons. However, hydrophobic materials typically are difficult to incorporate into the catalyst layer, particularly those that require high sintering temperatures. Furthermore, hydrophobic additives also have a tendency to agglomerate, thereby requiring high shear mixing, which makes them difficult to process with the catalyst into a catalyst ink. In addition, hydrophobic additives are difficult to wet and keep well dispersed in the catalyst ink, which makes it challenging to apply the catalyst ink evenly or uniformly to any of the gas diffusion layer, catalyst decal film and polymer electrolyte membrane.

The inventors surprisingly discovered that by including a layer comprising a fluoro-phosphonic acid compound between the anode catalyst layer and the polymer electrolyte membrane, cell reversal tolerance was improved without affecting performance even though the fluoro-phosphonic acid compound was not mixed into the anode catalyst layer. Without being bound by theory, it is believed that the phosphonic acid groups help with water retention while the fluoroalkyl groups help with the removal of oxygen, which is a by-product of the water electrolysis reaction, away from the reaction sites of the water electrolysis catalyst.

In some embodiments, the average molecular weight of the fluoro-phosphonic acid compound ranges from about 200 to 1200 g/mol. In specific embodiments, the average molecular weight of the fluoro-phosphonic acid compound ranges from about 300 to 1000 g/mol. In some embodiments, the average molecular weight of the fluoro-phosphonic acid compound ranges from about 250 to 1100 g/mol, from about 350 to 900 g/mol, from about 350 to 800 g/mol, from about 350 to 700 g/mol, from about 400 to 650 g/mol, or from about 400 to 600 g/mol.

In certain embodiments, the fluoro-phosphonic acid compound has a molecular weight of at least 200 g/mol. In some embodiments, the fluoro-phosphonic acid compound has a molecular weight of at least 150 g/mol. In certain embodiments, the fluoro-phosphonic acid compound has a molecular weight of at least 100 g/mol.

The loading of the fluoro-phosphonic acid compound in the layer may range from about 1 microgram/cm$^2$ to about 100 microgram/cm$^2$. In some embodiments, the loading of the fluoro-phosphonic acid compound in the layer ranges from about 1.5 microgram/cm$^2$ to about 90 microgram/cm$^2$, from about 1.5 microgram/cm$^2$ to about 80 microgram/cm$^2$, from about 2 microgram/cm$^2$ to about 70 microgram/cm$^2$, from about 2 microgram/cm$^2$ to about 65 microgram/cm$^2$, or from about 2.5 microgram/cm$^2$ to about 60 microgram/cm$^2$. In some embodiments, the loading may range from about 3 microgram/cm$^2$ to about 50 microgram/cm$^2$. One skilled in the art will readily be able to determine a suitable loading for a given membrane electrode assembly design and fuel cell application.

In one embodiment, the fluoro-phosphonic acid compound is a fluoroalkyl-phosphonic acid compound. In certain embodiments, the fluoroalkyl-phosphonic acid compound has an alkyl component and a perfluoro-alkyl component. For example, in some embodiments, the fluoro-phosphonic acid compound has the following structure:

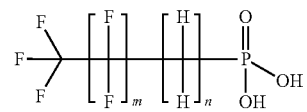

wherein:

m is an integer from 1 to 12; and n is an integer from 0 to 6.

In some embodiments, m is 3-10. In certain embodiments, m is 4-9. In some specific embodiments, m is 5-7. In some embodiments, m is 5. In some embodiments, m is 6. In some embodiments, m is 7. In some embodiments, m is 9.

In some embodiments, n is 1-6. In certain embodiments, n is 1-4. In some specific embodiments, n is 1-2. In some embodiments, n is 2. In some embodiments, n is 0.

In some embodiments, m is 3-10 and n is 1-4. In certain embodiments, m is 4-9 and n is 1-4. In some embodiments, m is 4-9 and n is 1-2. In some embodiments, m is 5-7 and n is 1-2. In some specific embodiments, m is 5 and n is 2. In other embodiments, m is 7 and n is 2. In still other embodiments, m is 9 and n is 0.

In specific embodiments, the fluoro-phosphonic acid compound is a fluoroalkyl-phosphonic acid compound, such as 2-perfluorohexyl ethyl phosphonic acid and 1H, 1H, 2H, 2H-heptadecafluorodec-1-yl phosphonic acid (C$_{10}$—PFPA). That is, in some embodiments, the fluoro-phosphonic acid compound has one of the following structures:

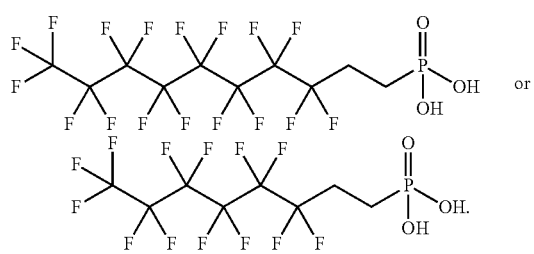

In more specific embodiments, the fluoro-phosphonic acid compound has the following structure:

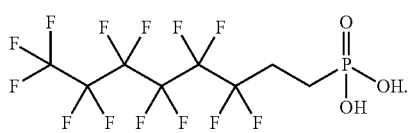

In other specific embodiments, the fluoro-phosphonic acid compound has the following structure:

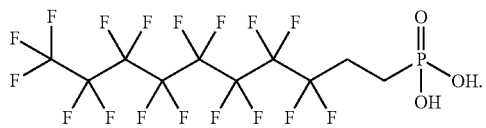

Although the compounds of the disclosure depicted as fully protonated (i.e., —P(=O)(OH)$_2$), one of skill in the art will understand that the protonation state of the compound will vary depending on pH and the deprotonated forms (i.e., —P(=O)(O$^-$)$_2$ and —P(=O)(O$^-$)(OH)) are included in the foregoing embodiments. The anode and/or cathode catalyst layers may include at least one noble metal and a binder, such as an ionomer and/or hydrophobic agent. The noble metal may comprise a precious metal, such as platinum or an alloy of platinum. In embodiments where a platinum alloy catalyst is employed, the alloy may include another noble metal, such as gold, ruthenium, iridium, osmium, palladium, silver; and compounds, alloys, solid solutions, and mixtures thereof. While noble metals are presently described, it is expected that non-noble metals, such as such as cobalt, iron, molybdenum, nickel, tantalum, tin, tungsten; and compounds, alloys, solid solutions, and mixtures thereof, can also be used in place of, or in addition to, the noble metal catalyst in the anode and/or cathode catalyst layers.

The noble metal catalyst may either be unsupported or supported in dispersed form on a suitable electrically conducting particulate support. In some embodiments, the support used is itself tolerant to voltage reversal. Thus, it is desirable to consider using supports that are more corrosion resistant.

The corrosion resistant support material may comprise carbon, if desired. High surface area carbons, such as acetylene black or furnace black, are commonly used as supports for such catalysts. Generally, the corrosion resistance of a carbon support material is related to its graphitic nature: the more graphitic the carbon support, the more corrosion resistant it is. Graphitized carbon BA (TKK, Tokyo, JP) has a similar BET surface area to Shawinigan acetylene carbon and is a suitable carbon support material in some embodiments. In other embodiments suitable carbon support materials may include nitrogen-, boron-, sulfur-, and/or phosphorous-doped carbons. In some embodiments, the carbon support material comprises carbon nanofibres, carbon nanotubes, carbon nanohorns, graphenes, aerogels and combinations thereof. Instead of carbon, carbides or electrically conductive metal oxides may be considered as a suitable high surface area support for the corrosion resistant support material. For instance, in some embodiments, the corrosion resistant support material comprises tantalum oxide, titanium oxide, niobium oxide or combinations thereof. In this regard, other valve metal oxides might be considered as well if they have acceptable electronic conductivity when acting as catalyst supports.

The layer comprising a fluoro-phosphonic acid compound may be dispersed or dissolved in a solvent and then applied by various methods. Such methods include, but are not limited to, spraying, dip-coating, wire-wound coating, screen-printing, microgravure coating, atomic layer deposition, and the like on any one of the gas diffusion layers, the catalyst layers, and the polymer electrolyte membrane. Alternatively, fluoro-phosphonic acid compound may be incorporated by soaking the gas diffusion layer ("GDL") and or/catalyst layer. In some embodiments, the fluoro-phosphonic acid compound may be mixed with another ionomer, such as a sulfonic acid ionomer, and/or conductive particles, such as carbon, prior to application.

As previously mentioned, the anode and cathode catalyst layers may be applied to a GDL to form anode and cathode electrodes, or to a decal transfer sheet which is then decal transferred to a surface of the GDL or polymer electrolyte, or applied directly to the surface of the polymer electrolyte to form a catalyst-coated membrane ("CCM"). The electrodes or CCM can then be bonded under heat and/or pressure with other components to form an MEA. Alternatively, the application of the catalyst layer on the desired substrate may occur at the same time the remaining MEA components are bonded together.

The present catalyst layers may be applied according to known methods. For example, the catalyst may be applied as a catalyst ink or slurry, or as a dry mixture. Catalyst inks may be applied using a variety of suitable techniques (e.g., hand and machine methods, including hand brushing, notch bar coating, fluid bearing die coating, wire-wound rod coating, fluid bearing coating, slot-fed knife coating, three-roll coating, screen-printing, ultrasonic spray, inkjet, and decal transfer) to the surface of the polymer electrolyte or GDL. Examples of dry deposition methods include spraying, vacuum deposition, and electrostatic powder deposition techniques.

Catalyst inks typically incorporate the catalysts and binder in a solvent/dispersant to form a solution, dispersion or colloidal mixture. Suitable solvents/dispersants include water, organic solvents such as alcohols (e.g., methanol, ethanol, isopropyl alcohol, etc.) and polar aprotic solvents (e.g., N-methylpyrrolidinone, dimethylsulfoxide, dimethylformamide and N,N-dimethylacetamide), and mixtures thereof. Depending on the amount of water, one can distinguish water-based inks, wherein water forms the major part of the solvents used, from inks wherein organic solvents form the major part. Catalyst inks may further include surfactants and/or pore forming agents, if desired. Suitable pore formers include methyl cellulose; sublimating pore-forming agents such as durene, camphene, camphor and naphthalene; and pore-forming solvents that are immiscible with the catalyst ink solvent/dispersant, such as n-butyl acetate in polar aprotic solvent/dispersant systems.

Accordingly, one embodiment provides a method of making a membrane electrode assembly comprising mixing a fluoro-phosphonic acid compound with a solvent, an ionomer, conductive particles, or combinations thereof to create a mixture, and applying the mixture to one or more of the following, an anode catalyst layer, an anode gas diffusion layer, a polymer electrolyte membrane, a cathode catalyst layer, or a cathode gas diffusion layer.

In some of the foregoing embodiment, the fluoro-phosphonic acid compound is a fluoroalkyl-phosphonic acid compound. In more specific embodiments, the fluoro-phosphonic acid compound has the following structure:

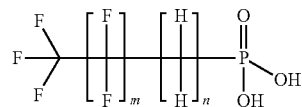

wherein:
m is an integer from 1 to 12; and
n is an integer from 0 to 6.

For example, in some embodiments, m is 5-7 and n is 1-2.

In some embodiments, the fluoro-phosphonic acid compound has the following structure:

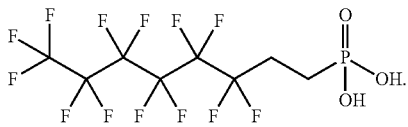 [SMILES: O=P(O)(O)CCC(F)(F)C(F)(F)C(F)(F)C(F)(F)C(F)(F)C(F)(F)F]

In other embodiments, the fluoro-phosphonic acid compound has the following structure:

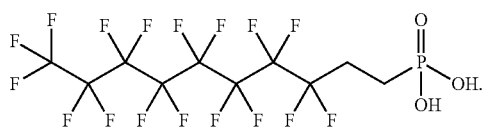 [SMILES: O=P(O)(O)CCC(F)(F)C(F)(F)C(F)(F)C(F)(F)C(F)(F)C(F)(F)C(F)(F)C(F)(F)F]

In certain specific embodiments, the fluoro-phosphonic acid compound has a molecular weight of at least 200 g/mol.

The selection of additional components for the catalyst mixture and the choice of application method and GDL to which it is applied are not essential to the present disclosure, and will depend on the physical characteristics of the mixture and the substrate to which it will be applied, the application method and desired structure of the catalyst layer. Persons of ordinary skill in the art can readily select suitable catalyst mixtures and application methods for a given application.

EXAMPLES

The MEAs were made with the following electrode structures as listed in Table 1, with the CCM sandwiched between two AvCarb® GDLs (AvCarb Materials Solutions, Lowell, Mass.). The active area of each of the MEAs was 45 cm².

TABLE 1

Anode and cathode catalyst structures for MEAs

| MEA Example | Anode | Cathode |
|---|---|---|
| Comparative MEA 1 | 50% Pt supported on graphitized carbon black at a catalyst loading of ~0.1 mg Pt/cm²; ~0.0067 g/m² IrO$_2$/TiO$_2$, Ionomer (23%): Nafion ® | 50% Pt supported on graphitized carbon black at ~0.4 mg Pt/cm² Ionomer (23%): Nafion ® |
| Example MEA 1 | 50% Pt supported on graphitized carbon black at a catalyst loading of ~0.1 mg Pt/cm²; ~0.0067 g/m² IrO$_2$/TiO$_2$, C$_{10}$-PFPA loading of 0.02 mg/cm² Ionomer (23%): Nafion ® | 50% Pt supported on graphitized carbon black at ~0.4 mg Pt/cm² Ionomer (23%): Nafion ® |

For Example MEA 1, the C$_{10}$-PFPA was mixed with isopropanol and then sprayed onto the anode catalyst layer at 75° C. After spraying, the anode catalyst layer with a thin layer of C$_{10}$-PFPA was decal transferred to a surface of a Nafion® membrane such that the C$_{10}$-PFPA layer was between the anode catalyst layer and the membrane.

The MEAs were then tested in a Ballard Standard Test Cell (STC) test fixture with graphite plates. The fuel cells were first conditioned overnight under the following conditions at 1.3 A/cm²:

TABLE 2

| Conditioning parameters | |
|---|---|
| Temperature | 75° C. (coolant) |
| Inlet Dew Point | 75° C. (fuel and oxidant) |
| Fuel | 100% hydrogen |
| Oxidant | air |
| Reactant inlet pressure | 5 psig (fuel and oxidant) |
| Reactant flow | 4.5 (fuel), 9.0 (oxidant) slpm |

Cell Reversal Testing

The fuel cells were conditioned overnight at 1.3 A/cm² at the conditions listed in Table 2. It was shown that both there were no performance difference between the two fuel cells. Therefore, the C$_{10}$-PFPA did not have a negative effect on performance.

The fuel supply was then switched to humidified nitrogen and the cell was supplied with 200 mA/cm² of current through an external power supply under current control mode. The cell reversal tolerance time was monitored until the cell voltage reached −2.0 V. It was shown that Comparative MEA 1 had a cell reversal tolerance time of about 50 minutes while Example MEA 1 with the C$_{10}$-PFPA layer had a cell reversal tolerance time of over 70 minutes.

While the fluoro-phosphonic acid compound has been described for use in the anode, it is expected that the fluoro-phosphonic acid is also beneficial for the cathode, either between the cathode catalyst layer and the polymer electrolyte membrane and/or between the cathode catalyst layer and the cathode gas diffusion layer. One skilled in the art can readily determine a desirable amount of fluoro-phosphonic acid compound in one or both of those layers for a given MEA design and fuel cell application.

While the present electrodes have been described for use in PEM fuel cells, it is anticipated that they may be useful in other fuel cells having an operating temperature below about 250° C. They are particularly suited for acid electrolyte fuel cells, including phosphoric acid, PEM and liquid feed fuel cells. It is also contemplated that this treatment may also be useful for other metal oxides comprising ruthenium.

All of the above U.S. patents, U.S. patent application publications, U.S. patent applications, foreign patents, foreign patent applications and non-patent publications referred to in this specification and/or listed in the Application Data Sheet, are incorporated herein by reference in their entirety. This application also claims the benefit of U.S. Provisional Patent Application No. 62/537,365, filed Jul. 26, 2017, and is incorporated herein by reference in its entirety.

While particular elements, embodiments and applications of the present disclosure have been shown and described, it will be understood, of course, that the disclosure is not limited thereto since modifications may be made by those skilled in the art, particularly in light of the foregoing teachings. It is therefore contemplated by the appended claims to cover such modifications that incorporate those features coming within the scope of the present disclosure.

What is claimed is:

1. A membrane electrode assembly comprising:
   an anode electrode comprising an anode catalyst layer and an anode gas diffusion layer;
   a cathode electrode comprising a cathode catalyst layer and a cathode gas diffusion layer;
   a polymer electrolyte membrane interposed between the anode catalyst layer and the cathode catalyst layer; and
   a layer comprising a fluoroalkyl-phosphonic acid compound between at least one of the anode gas diffusion layer and the anode catalyst layer, the anode catalyst layer and the polymer electrolyte membrane, the polymer electrolyte membrane and the cathode catalyst layer, and the cathode catalyst layer and the cathode gas diffusion layer;

wherein the fluoroalkyl-phosphonic acid compound has the following structure:

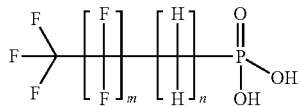

wherein:
m is an integer from 1 to 12; and
n is an integer from 0 to 6;
wherein the fluoroalkyl-phosphonic acid compound has a molecular weight of at least 200 g/mol.

2. The membrane electrode assembly of claim 1, wherein m is 5-7 and n is 1-2.

3. The membrane electrode assembly of claim 1, wherein the fluoroalkyl-phosphonic acid compound has the following structure:

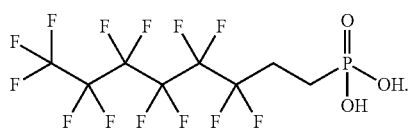 [SMILES: O=P(O)(O)CCC(F)(F)C(F)(F)C(F)(F)C(F)(F)C(F)(F)C(F)(F)F]

4. The membrane electrode assembly of claim 1, wherein the fluoroalkyl-phosphonic acid compound has the following structure:

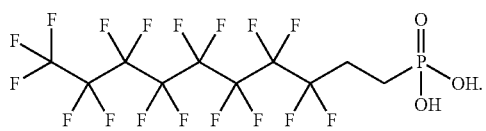 [SMILES: O=P(O)(O)CCC(F)(F)C(F)(F)C(F)(F)C(F)(F)C(F)(F)C(F)(F)C(F)(F)C(F)(F)F]

5. The membrane electrode assembly of claim 1, wherein the layer comprising the fluoroalkyl-phosphonic acid compound comprises about 1 microgram/cm$^2$ to about 100 microgram/cm$^2$ of the fluoroalkyl-phosphonic acid compound.

6. The membrane electrode assembly of claim 1, wherein the layer comprising the fluoroalkyl-phosphonic acid compound comprises about 3 microgram/cm$^2$ to about 50 microgram/cm$^2$ of the fluoroalkyl-phosphonic acid compound.

7. The membrane electrode assembly of claim 1, wherein the layer comprising the fluoroalkyl-phosphonic acid compound is between the anode catalyst layer and the polymer electrolyte membrane.

8. The membrane electrode assembly of claim 1, wherein the layer comprising the fluoroalkyl-phosphonic acid compound is between the anode gas diffusion layer and the anode catalyst layer.

9. The membrane electrode assembly of claim 1, wherein the layer comprising the fluoroalkyl-phosphonic acid compound is between the polymer electrolyte membrane and the cathode catalyst layer.

10. The membrane electrode assembly of claim 1, wherein the layer comprising a fluoro phosphonic the fluoroalkyl-phosphonic acid compound is between the cathode catalyst layer and the cathode gas diffusion layer.

11. A method of making a membrane electrode assembly comprising:
mixing a fluoroalkyl-phosphonic acid compound with a solvent, an ionomer, conductive particles, or combinations thereof to create a mixture; and
applying the mixture to one or more of the following:
an anode catalyst layer;
an anode gas diffusion layer;
a polymer electrolyte membrane;
a cathode catalyst layer; or
a cathode gas diffusion layer;
wherein the fluoroalkyl-phosphonic acid compound has the following structure:

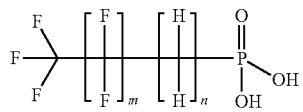

wherein:
m is an integer from 1 to 12; and
n is an integer from 0 to 6;
wherein the fluoroalkyl-phosphonic acid compound has a molecular weight of at least 200 g/mol.

12. The method of claim 11, wherein m is 5-7 and n is 1-2.

13. The method of claim 11, wherein the fluoroalkyl-phosphonic acid compound has the following structure:

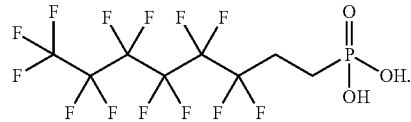 [SMILES: O=P(O)(O)CCC(F)(F)C(F)(F)C(F)(F)C(F)(F)C(F)(F)C(F)(F)F]

14. The method of claim 11, wherein the fluoroalkyl-phosphonic acid compound has the following structure:

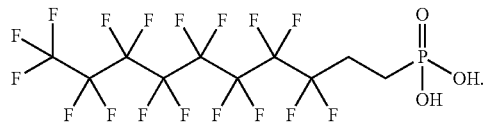 [SMILES: O=P(O)(O)CCC(F)(F)C(F)(F)C(F)(F)C(F)(F)C(F)(F)C(F)(F)C(F)(F)C(F)(F)F]

* * * * *

UNITED STATES PATENT AND TRADEMARK OFFICE
CERTIFICATE OF CORRECTION

PATENT NO. : 11,431,014 B2
APPLICATION NO. : 16/633526
DATED : August 30, 2022
INVENTOR(S) : Rajesh Bashyam et al.

It is certified that error appears in the above-identified patent and that said Letters Patent is hereby corrected as shown below:

In the Claims

Column 12, Claim 10, Lines 9-10:
"wherein the layer comprising a fluoro phosphonic the fluoroalkyl-phosphonic acid compound"
Should read:
--wherein the layer comprising the fluoroalkyl-phosphonic acid compound--.

Signed and Sealed this
Twenty-fourth Day of September, 2024

Katherine Kelly Vidal
*Director of the United States Patent and Trademark Office*